United States Patent [19]

Dietz et al.

[11] 4,153,362
[45] May 8, 1979

[54] BATTERY OPERATED CAMERA HAVING MEANS FOR MOUNTING AN EXTERNAL BATTERY

[75] Inventors: Milton S. Dietz, Lexington; William J. McCune, Jr., South Lincoln, both of Mass.

[73] Assignee: Polaroid Corporation, Cambridge, Mass.

[21] Appl. No.: 764,651

[22] Filed: Feb. 1, 1977

[51] Int. Cl.² ............................................ G03B 17/56
[52] U.S. Cl. .................................... 354/293; 352/243; 354/354
[58] Field of Search .................................... 354/81–82, 354/293, 354; 352/243; 429/96, 98, 99, 100; 224/5 H, 5 V, 45 P, 52, 55

[56] References Cited

U.S. PATENT DOCUMENTS

| 2,303,988 | 12/1942 | Christensen | 429/98 |
| 3,134,547 | 5/1964 | Kapteyn et al. | 354/293 X |
| 3,263,589 | 8/1966 | Rice | 354/76 |
| 3,508,482 | 4/1970 | Taylor | 352/243 |
| 3,852,788 | 12/1974 | Veda | 354/293 |
| 3,887,393 | 6/1975 | LaRue, Jr. | 429/99 |
| 3,941,618 | 3/1976 | Mabuchi | 429/99 |
| 4,007,470 | 2/1977 | Land | 354/354 |

Primary Examiner—L. T. Hix
Assistant Examiner—William B. Perkey
Attorney, Agent, or Firm—John S. Vale

[57] ABSTRACT

A battery operated camera includes a carrying or neck strap having a handle thereon for receiving and supporting an external electrical battery for powering electrical components of the camera.

6 Claims, 6 Drawing Figures

BATTERY OPERATED CAMERA HAVING MEANS FOR MOUNTING AN EXTERNAL BATTERY

CROSS REFERENCE TO RELATED APPLICATIONS

The present application is related to application Ser. No. 534,445, filed on Dec. 19, 1974 by M. S. Dietz and W. J. McCune, Jr. (now abandoned) and copending application Ser. No. 534,444 filed on Dec. 19, 1974 (now U.S. Pat. No. 4,007,470), both of these prior applications being assigned to the same assignee as the present application.

BACKGROUND OF THE INVENTION

1. Field of the Invention

The present invention relates to the field of photography and, more specifically, to battery operated cameras.

2. Description of the Prior Art

The present trend in the camera field is toward minaturized and highly automated, electrically operated and controlled cameras. While the physical size of the camera is decreasing, the requirement for electrical energy or battery capacity is rapidly expanding. This is particularly true in the self-developing camera field wherein automated cameras include high-drain rate motors for driving the pressure applying rollers which advance a film unit therebetween to distribute a fluid processing composition within the film unit.

One solution to the problem is to provide a thin flat battery in the camera or film pack capable of delivering high rates of current and sufficient energy to expose and process all of the film units (usually 10) in the film container, after which, the battery is discarded. For an example of a camera which is adapted to be powered by a battery in a film container, see U.S. Pat. No. 3,774,516, issued to J. P. Burgarella, et al. on Nov. 27, 1974.

The present invention is directed to an alternative self-developing camera system wherein a battery is mounted externally of the camera housing.

The prior art is replete with cameras or camera systems which use an external battery or battery pack for powering the camera and/or an artificial lighting system. Generally, these arrangements are bulky and awkward to use. The most commonly observed system is a high voltage battery pack for powering a high intensity strobe lighting unit. The heavy battery pack is usually suspended from the photographer's belt. Other systems include large battery holders attached to the camera housing or a camera flash unit. For an example of an underwater light system incorporating an auxilliary battery pack, see U.S. Pat. No. 2,872,622.

For other relevant prior art relating to structures for mounting external batteries see U.S. Pat. Nos. 2,303,988; 3,134,547; 3,508,482; 3,852,788; and 3,887,393.

SUMMARY OF THE INVENTION

The present invention provides a battery operated camera having provisions for an externally mounted electrical battery. In a preferred embodiment of the invention, the camera includes a carrying strap which is attachable to the camera housing and a member that is attached to the carrying strap which serves the dual purpose of (1) holding an electrical battery for powering the camera and (2) serving as a handle on the carrying strap.

The carrying strap is preferably flexible and sufficiently long for the user to comfortably wear the camera about his neck. The handle/battery holder is connected across the strap at a point near the connection of the strap to the camera housing such that the handle provides a convenient hand hold on the strap when the user does not wish to wear the camera about the neck. The aesthetics of this arrangement are enhanced by concealing the wires, leading from the battery to the camera, within a portion of the camera carrying strap.

The handle is preferably relatively rigid and hollow for receiving and supportively enclosing the battery. It is attached to the neck strap in a position whereby the user may comfortably wear the camera about the neck, utilizing the neck strap, without interference from the handle.

Therefore, it is an object of the invention to provide a battery operated camera which includes a carrying strap having a handle thereon that also serves as holder for an external battery for powering the camera.

It is another object to provide such a camera wherein the lead wires from the battery holder to the camera are concealed within the carrying strap.

It is yet another object of the invention to provide a battery operated camera which includes a carrying strap having a carrying handle thereon which allows the user to wear the camera about his neck or hold it in his hand by means of the carrying handle and further includes the provision of mounting an external battery in the handle.

Another object of the invention is to provide an assembly for a battery operated camera which includes a camera carrying strap having a handle thereon which also serves as a holder for an external battery for powering the camera.

Yet another object is to provide such an assembly wherein the handle may be located in at least two operative positions on the carrying strap.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

The present invention relates to battery-powered cameras and more specifically to means and methods for attaching and electrically connecting an external electrical battery to such a camera.

Figure 1:
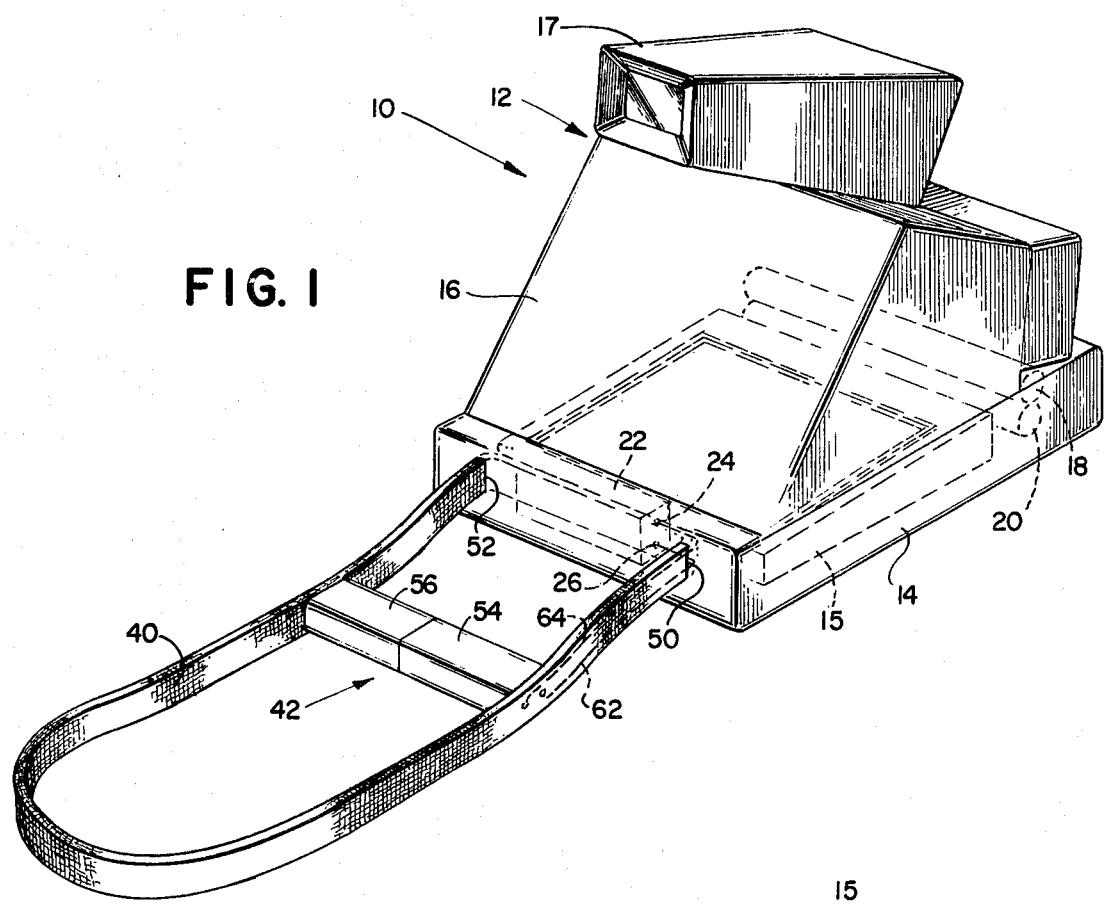
FIG. 1 is a perspective view of a battery operated camera having a carrying strap thereon and a handle on the strap for receiving and supporting an electrical battery.

FIG. 1 of the drawings shows a camera 10 which is enclosed by a camera housing 12 that may be of the folding or nonfolding type.

The illustrated camera 10 is of the self-developing type but the inventive concepts to be described hereinafter apply equally to more conventional battery operated cameras as well.

Camera 10 includes a base section 14 having a chamber therein for receiving and supporting a film container 15 (shown in dotted lines) holding a plurality of film units of the self-developing type, an example of which is disclosed in U.S. Pat. No. 3,415,644 issued to E. H. Land on Dec. 10, 1968.

The upper portion 16 of camera housing 12 defines an exposure chamber and mounts a viewing device 17 and exposure means including a lens, shutter and image-reversal mirror (not shown) for exposing the forwardmost film unit in the film container 15 located in base 14.

Subsequent to exposure, a film advance device (not shown) engages the forwardmost film unit and advances it forwardly to a pair of pressure applying rollers 18 and 20 between which the film unit is advanced to distribute a fluid processing composition between predetermined layers of the film unit. From the rollers 18 and 20, the film unit is advanced through a film exit slot (not shown) at the forward end of the camera.

The illustrated camera 10 is intended to represent a general class of highly automated, battery-operated, self-developing cameras, an example of which may be found in U.S. Pat. No. 3,774,516.

These cameras have a plurality of electrically operated components including: a motor for driving the film advanced device and rollers 18 and 20; an electronic logic and power system for powering and controlling the sequence of events making up a cycle of camera operation; an exposure control circuit including a photocell for automatically terminating exposure in response to evaluating scene lighting conditions; and a flash system for providing auxiliary illumination when required. The above-described electrically operated components, systems, and/or circuits are diagrammatically illustrated in FIGS. 1 and 2 of the drawings as an electrical component or circuit 22 located in base section 14.

Figure 2:
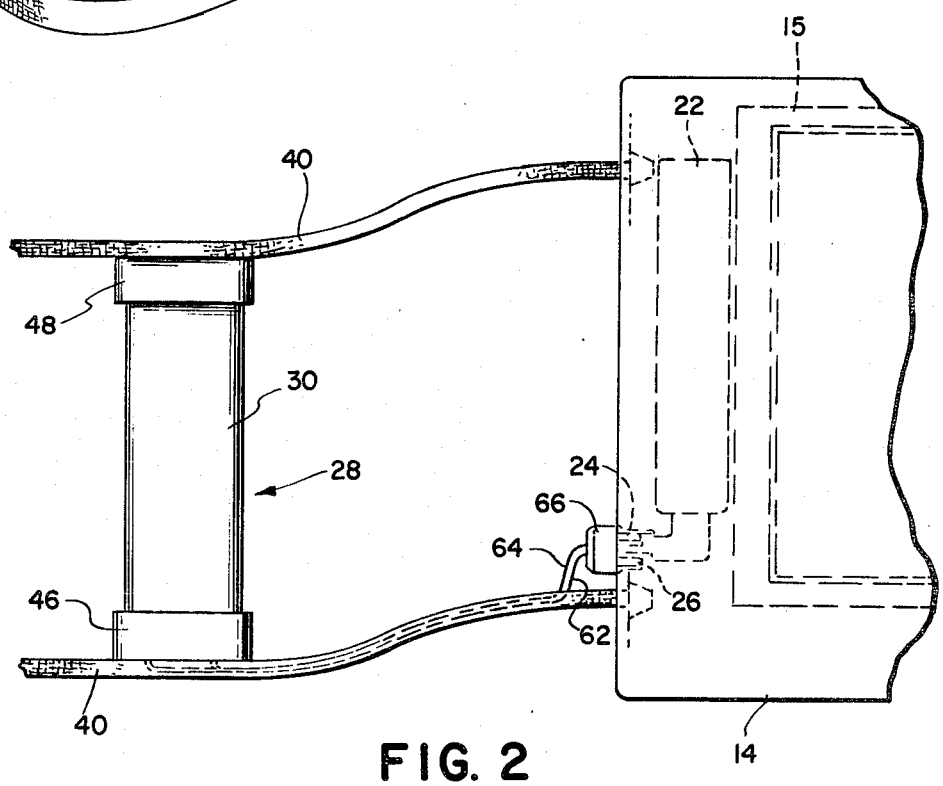
FIG. 2 is an elevational view of a portion of a battery operated camera having a carrying strap attached thereto and showing a pair of end caps on the strap which hold opposite ends of a battery in position such that the major portion of the battery serves as a carrying handle.

Component or circuit 22 has a pair of electrically conductive terminals 24 and 26, electrically coupled thereto, and to which an electrical battery is adapted to be electrically connected for powering component or circuit 22. These terminals 24 and 26 may be located within base section 14 (as shown in FIG. 1) or may be accessible from the exterior of camera housing 12 (as shown in FIG. 2).

One method of supplying power to circuit or component 22 is to provide an electrical battery in the bottom of a film container 15, the terminals of which are automatically connected to terminals (similar to terminals 24 and 26 but mounted on the bottom wall of base section 14) when the film container 15 is fully inserted into its operative position in base section 14. Such a system is disclosed in the aforementioned U.S. Pat. No. 3,774,516.

In its simplest terms, the present invention provides a battery operated camera which has a carrying strap attached thereto and includes a handle on the strap that is configured to hold a relatively large capacity battery for supplying sufficient power to expose and process many containers of film.

Figure 3:
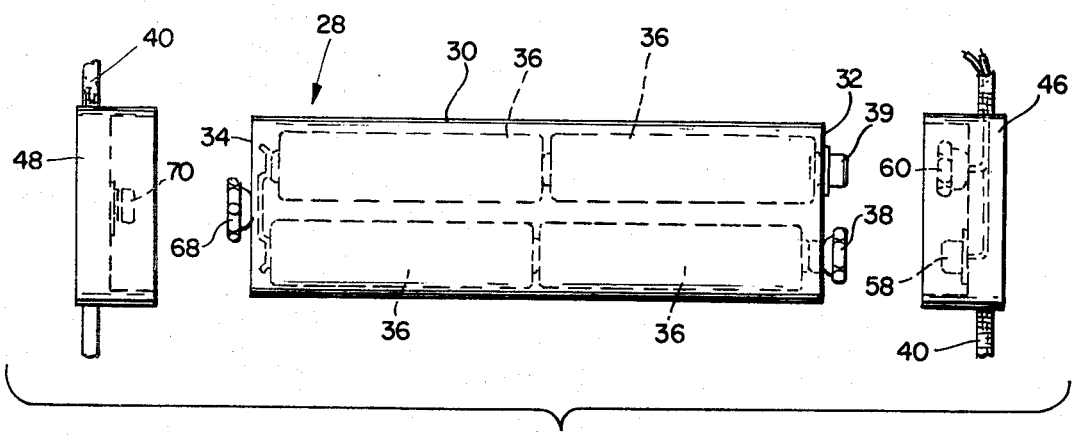
FIG. 3 is an elevational view, shown in exploded fashion of a four-cell battery and the end caps of FIG. 2.

One embodiment of a high capacity battery 28, suitable for powering camera 10 is shown in FIG. 3 of the drawings. It comprises a generally elongated, parallelepiped shaped, hollow battery housing 30, having leading and trailing end walls 32 and 34, respectively. Within housing 30 are four elongated, cylindrical, electrochemical cells 36 (preferably 1.5 volt, AA alkaline cells) connected in series to form a 6-volt battery. Plus and minus, female and male, snap-together battery terminals 38 and 39 are provided on the leading end wall 32 of battery housing 30.

In terms of capacity, it has been found that battery 28 will supply power for between 250 and 350 operating cycles of camera 10 depending on the age and condition of cells 36. While battery 28 is shown to be a "factory assembled" unit, it will be understood that battery housing 30 may have an access door therein so that the individual cells 36 may be replaced.

In FIG. 1 of the drawings, camera 10 is shown to include an elongated and flexible carrying or neck strap 40 attached to the trailing end of base section 14 and having a fairly rigid, transverse handle 42 attached to the opposite sides of strap 40 for receiving and supporting a battery 28. In this embodiment, the battery 28 is completely enclosed by handle 42.

In FIG. 2 of the drawings, the neck strap 40 has a pair of opposed end caps 46 and 48 attached thereto for receiving and supporting the leading and trailing ends, respectively, of a battery 28 such that the major portion of the battery housing 30, intermediate the opposite ends, serves as the handle.

The carrying strap 40 may be made of any suitable material such as molded or extruded plastic or a woven material and preferably includes a hollow core such that lead wires for connecting the battery terminals 38 and 39 to the camera terminals 24 and 26 may be concealed therein, as will be described later.

Camera 10 may include a pair of openings 50 and 52 (as shown in FIG. 1) at the trailing end thereof through which strap 40 may pass in a continuous loop to make the connection between strap 40 and camera housing 12. The connection of the free ends of the strap may be made within camera housing 12 or externally by means of an adjustable buckle arrangement. In a camera 10 wherein the camera terminals 24 and 26 are located within housing 12, it is preferable for at least that portion of the strap 40 carrying the lead wire to extend into the base section 14.

Alternatively, the free ends of strap 40 may be directly attached to the trailing end of housing 12, as is shown in FIG. 2 of the drawings, by any suitable means such as snap connectors or split ring arrangements that are well known in the photographic art.

In the embodiment shown in FIG. 1, the hollow handle 42 may be formed of complementary telescoping or snap-together handle sections 54 and 56 that are dimensioned to receive and support a battery 28 therein. The ends of handle sections 54 and 56 may be attached to the sides of strap 40 by any suitable means such as rivets, friction connectors or the like.

Handle section 54 includes a complementary pair of male and female snap-together connectors therein for receiving the terminals 38 and 39 of battery 28. Although not shown in FIG. 1, these connectors are similar to a pair of connectors 58 and 60 shown in an end cap 46 in FIG. 3 of the drawings.

Concealed in the hollow core of strap 40 and having one end thereof electrically connected to the connectors in handle section 54 are a pair of lead wires 62 and 64, the opposite ends of which are connected to the camera terminals 24 and 26. Wires 62 and 64 serve as the means for electrically connecting the battery 28 to the camera component or circuit 22.

Where the terminals 24 and 26 are accessible from the exterior of camera housing 12, the wires 62 and 64 may exit from the strap 40 at a location in the vicinity of terminals 24 and 26 and terminate in a connecting plug 66 (see FIG. 2).

In a preferred embodiment, handle 42 is positioned on strap 40 at a point that is fairly close to the trailing end of camera 10 thus providing a convenient hand hold on strap 40 as an alternative to wearing camera 10 about the neck.

The handle sections 54 and 56 may be made of any suitable material such as plastic and preferably are of molded construction. While handle 42 has been shown to receive and support a factory assembled four cell battery 28, it is within the scope of the present invention to provide a handle 42 that is configured to receive four individual cells that may be individually replaced when they become exhausted.

Figure 6:
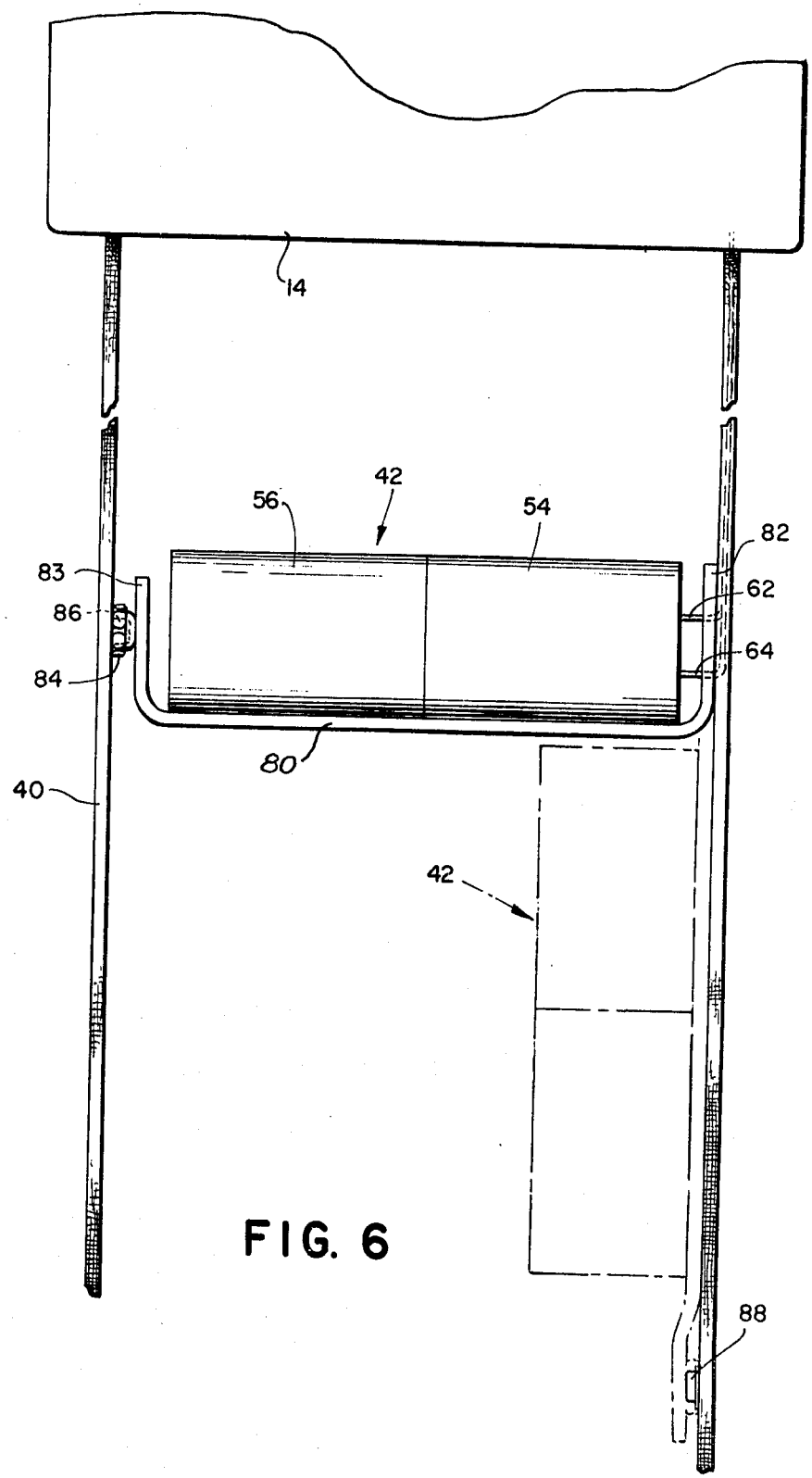
FIG. 6 is a plan view of an alternative embodiment of the present invention wherein the handle may be positioned in either one of two operative positions on the carrying strap.

FIG. 6 of the drawings shows an alternative embodiment wherein the handle 42 has a convertible feature allowing it to be located in at least two operative positions on the carrying strap 40.

The handle 42 preferably includes a strap 80 thereon running along the length thereof. The leading end 82 of the strap extends beyond the leading end of the handle 42 and may be permanently attached to one side of strap 40 as shown. The lead wires 62 and 64 extend through a hollow core of leading end 82 of strap 80 into the hollow core of strap 40.

The opposite, or trailing end 83 of strap 80 has a snap connector 84 thereon which may be releasably connected to either one of two snap connectors 86 and 88 on strap 40. Connector 86 is positioned on the opposite side of strap 40 and is utilized when the handle 42 is to be located in the transverse position shown in FIG. 6 in solid lines. Should the user wish to convert the handle to the longitudinal position, shown in dotted lines, one merely disconnects connector 84 from connector 86 and connects it to connector 88 which is located on the same side of the strap 40 as the connection of the leading end of handle 42 thereto.

It will be noted that neck strap 40 is sufficiently long such that even with the handle 42 attached thereto, the user may comfortably wear the camera about his neck without interference from handle 42. That is, strap 40 is sufficiently long between handle 42 and the closed or U-shaped end of strap 40 so that the user may easily slip this portion of strap 40 over his head and remove it without interference from handle 42.

The embodiment shown in FIG. 2 of the drawings includes end caps 46 and 48 for receiving and supporting opposite ends of a battery 28. The end caps are preferably of molded plastic construction and are dimensioned to receive the respective leading and trailing ends of battery 28.

The first or leading end cap 46 includes the battery connectors 58 and 60 therein. When the leading end of battery 28 is inserted therein, a physical connection is established between the leading end of the battery 28 and the first end cap 46 by means of the complementary connectors. This same connection also establishes the electrical connection of battery 28 to the camera terminals 24 and 26 via lead wires 62 and 64.

Figure 4:
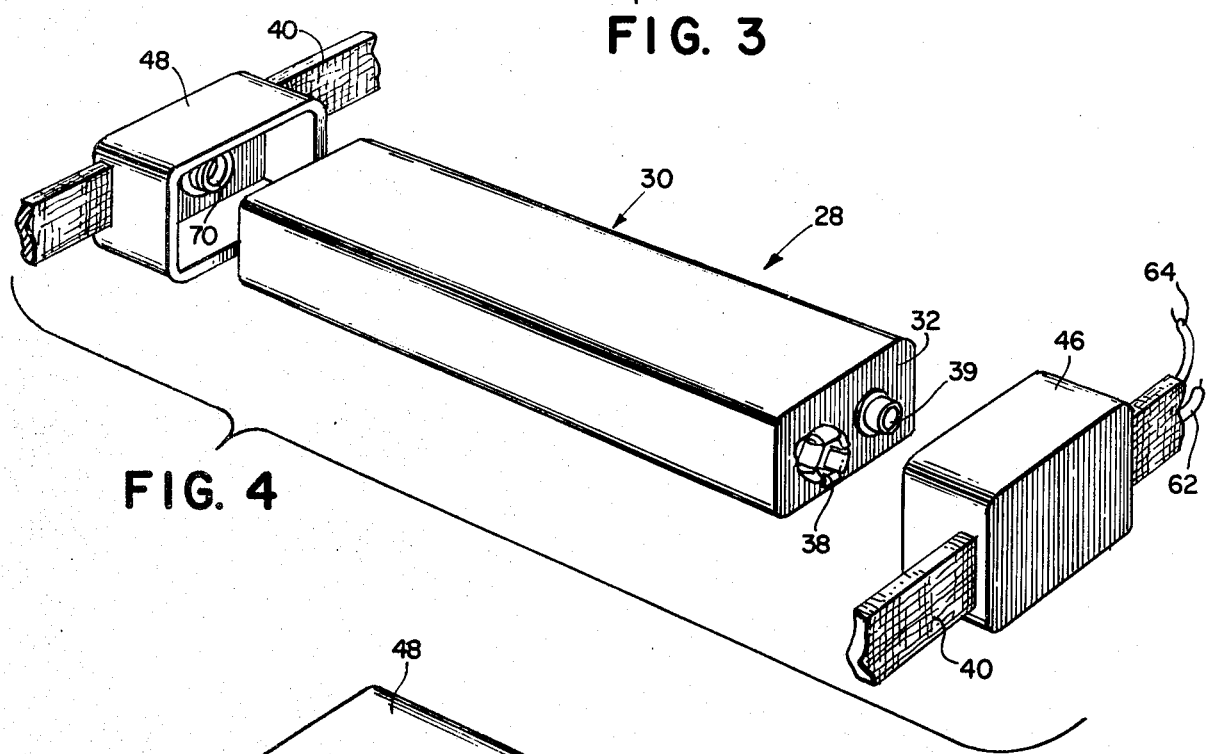
FIG. 4 is a perspective view, shown in exploded fashion of the battery and end caps of FIGS. 2 and 3.

The end caps 46 and 48 may be connected or attached to strap 40 by any suitable means such as rivets, adhesive or thermobonding or friction-type connectors shown in FIGS. 3 and 4 of the drawings.

Various means may be provided for making the physical connection between the trailing end of battery 28 and the second or trailing end cap 48.

One embodiment is to mold end cap 48 so that it closely conforms to the trailing end of battery housing 30 to establish a friction fit therebetween when the trailing end of battery housing 30 is inserted into end cap 48.

It is preferred however to provide a more positive means for making this releasable connection. This is accomplished by providing cooperating connecting or latching structure on the trailing end of battery housing 30 and the end cap 48 which is capable of interlocking in response to these two elements being brought into engagement with each other under the influence of a compressive force.

For example, the battery housing 30 may have one part 68 of a two-part snap-together connector on the trailing end wall 34 thereof which interlocks with the other part 70 of the connector in end cap 48. This type of arrangement is shown in FIGS. 3 and 4 of the drawings.

Figure 5:
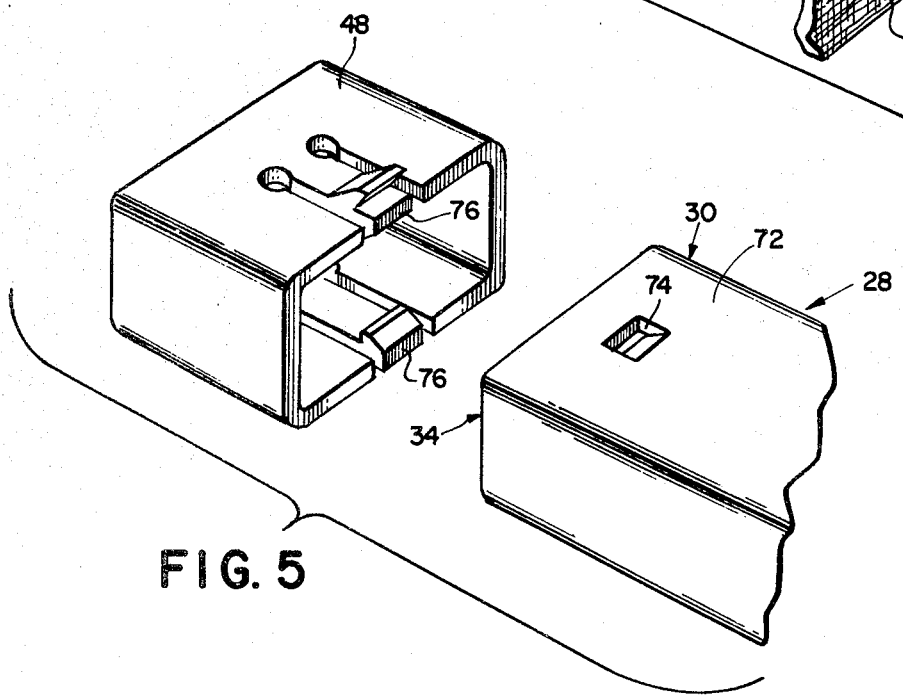
FIG. 5 is a perspective view, shown in exploded fashion, of an alternative embodiment for attaching one end cap to the trailing end of the battery housing.

An alternative embodiment is shown in FIG. 5 of the drawings. A substantially planar wall 72 of battery housing 30 has a recess 74 therein near the trailing end thereof. The end cap 48 includes an integrally molded and resilient tab lock or latch 76 thereon that is adapted to extend into recess 74 when the trailing end of battery housing 30 is inserted into end cap 48. In this manner the cooperating recess 74 and tab latch 76 establish the physical connection. As shown in FIG. 5, the battery housing may include two recesses 74 on opposite sides that are adapted to mate with two such tab latches 76 shown on opposite sides of end cap 48.

As best shown in FIG. 3 the cylindrical cells 36 are arranged in two side-by-side pairs of end-to-end cells. In a preferred embodiment, the recess 74 is arranged on wall 72 so that it is in interdigitated relationship with an adjacent pair of side-by-side cells therebeneath such that the material forming the recess 74 may extend into the battery housing 30 without contacting the cells therein.

Although not shown in the drawings, it will be understood that there are many two-part pressure interlocking materials such as Velcro (trademark) that may be provided on the trailing end of battery housing 30 and in end cap 48 to establish the physical connection therebetween.

In the illustrated embodiments, the carrying strap 40 has been shown to be an elongated U-shaped member having two ends or portions that are connected to the camera housing. It should be understood, however, that the inventive concepts described herein apply equally as well to a single carrying strap having only one point of connection to the camera housing. Such a single carrying strap may have a handle thereon for receiving and supporting a battery or, in the alternative, may have a single end cap (such as end cap 46) for receiving and supporting only a portion of the battery so that a battery so supported thereon serves as the handle.

Since certain changes may be made in the above photographic film assemblage and photographic apparatus without departing from the scope of the invention herein involved, it is intended that all matter contained in the above description or shown in the accompanying drawings shall be interpreted as illustrative and not in a limiting sense.

What is claimed is:

1. A camera having at least one component that is adapted to be powered by an electrical battery, said camera comprising:

a camera housing;

electrically conductive terminal means being electrically connected to the at least one component and to which such a battery is adapted to be electrically connected to supply power to the at least one component;

an elongated flexible neck strap coupled to said camera housing and being of sufficient length for a user to comfortably wear said camera about the neck, said neck strap having a central hollow core;

a relatively rigid hollow handle attached to said neck strap for providing a hand hold on said neck strap and for receiving and supportively enclosing such an electrical battery, said handle being positioned on said neck strap such that the user may alternatively hold onto said camera by grasping said handle or wear said camera about the neck, utilizing said neck strap, without interference from said handle; and electrically conductive means for electrically connecting such a battery supportively enclosed by said handle to said terminal means of said camera, said electrically conductive means having a major portion thereof concealed within said hollow central core of a portion of said neck strap intermediate said handle and said camera housing.

2. A camera as defined in claim 1 wherein said electrically conductive terminal means are located within said camera housing and said camera housing has an opening therein through which said portion of said neck strap concealing said major portion of said electrically conductive means may pass such that a portion of said electrically conductive means external of said neck strap and being located within said camera housing, when said portion of said neck strap extends through said opening, may be electrically connected to said terminal means within said camera housing.

3. A camera as defined in claim 1 wherein said electrically conductive terminal means is accessible from the exterior of said camera housing and said electrically conductive means includes a minor portion thereof which extends out of said neck strap in the vicinity of said terminal means, when said neck strap is connected to said camera housing, such that said minor portion of said electrically conductive means may be electrically connected to said terminal means.

4. A camera as defined in claim 1 wherein said handle is configured to receive and support a battery comprising at least four electrochemical cells connected in series.

5. A camera as defined in claim 4 wherein said handle is configured to receive and support a battery comprising four elongated cylindrical cells arranged in side-by-side pairs of two cells disposed in end-to-end relationship.

6. An assembly for attaching an external battery to a battery operated camera of the type including a camera housing and terminal means to which such a battery is adapted to be electrically connected to supply power to the camera, said assembly comprising:

a carrying strap for facilitating carrying such a camera, said carrying strap including means thereon for attaching said carrying strap to the camera housing;

a handle on said carrying strap for facilitating gripping said strap and including means for receiving and supporting such an electrical battery;

at least a portion of said handle being configured to be releasably attached to said carrying strap, said carrying strap including handle attaching means located at at least two locations thereon where said portion of said handle may be releasably attached thereto such that said handle may be located in at least two operative positions on said carrying strap.

* * * * *